US006067171A

United States Patent [19]

Yamada et al.

[11] Patent Number: 6,067,171

[45] Date of Patent: May 23, 2000

[54] PORTABLE COMMUNICATION APPARATUS

[75] Inventors: Makoto Yamada, Gifu; Atsushi Yokochi, Nagoya; Toshiro Haze, Kasugai, all of Japan

[73] Assignee: Brother Kogyo Kabushiki Kaisha, Nagoya, Japan

[21] Appl. No.: 08/719,065

[22] Filed: Sep. 24, 1996

[30] Foreign Application Priority Data

| | | | |
|---|---|---|---|
| Nov. 9, 1995 | [JP] | Japan | 7-291260 |
| Nov. 13, 1995 | [JP] | Japan | 7-294355 |
| Nov. 17, 1995 | [JP] | Japan | 7-299739 |

[51] Int. Cl.[7] .......... H04N 1/00

[52] U.S. Cl. .......... 358/406; 358/405; 379/102.04

[58] Field of Search .......... 358/406, 405, 358/422, 407, 421, 442, 412; 379/102.02, 102.04; 455/38.2, 38.3, 66, 67.1, 574, 556, 557; 395/750

[56] References Cited

U.S. PATENT DOCUMENTS

| | | | |
|---|---|---|---|
| 4,719,516 | 1/1988 | Nagashima | 358/448 |
| 4,743,831 | 5/1988 | Young | 320/48 |
| 5,182,655 | 1/1993 | Motoyanagi | 358/406 |
| 5,446,905 | 8/1995 | Koshiishi | 395/750 |
| 5,490,287 | 2/1996 | Itoh et al. | 455/115 |
| 5,497,339 | 3/1996 | Bernard | 364/705.05 |
| 5,677,944 | 10/1997 | Yamamoto et al. | 379/61 |
| 5,784,690 | 7/1998 | Maki | 455/127 |
| 5,845,142 | 12/1998 | Hayasaka | 395/750.06 |
| 5,876,870 | 3/1999 | Kawabata | 429/91 |

FOREIGN PATENT DOCUMENTS

| | | | |
|---|---|---|---|
| 0 536 043 A2 | 9/1992 | European Pat. Off. | H04N 1/32 |

*Primary Examiner*—Jerome Grant, II
*Attorney, Agent, or Firm*—Oliff & Berridge, PLC

[57] ABSTRACT

To minimize an occurrence of run-out of power in a battery in the middle of communication and an occurrence of a communication error caused thereby. The residual amount of power in the battery is detected. Communication is enabled only when the residual amount of power in the battery exceeds a predetermined amount. Information relative to the residual amount of power in the battery is displayed to allow an operator to recognize the residual amount of power in the battery. Further, information relative to the residual amount of power in the battery is transmitted to the transmission side so that information in excess of the residual amount of power in the battery on the receiving side is not transmitted to the receiving side.

15 Claims, 11 Drawing Sheets

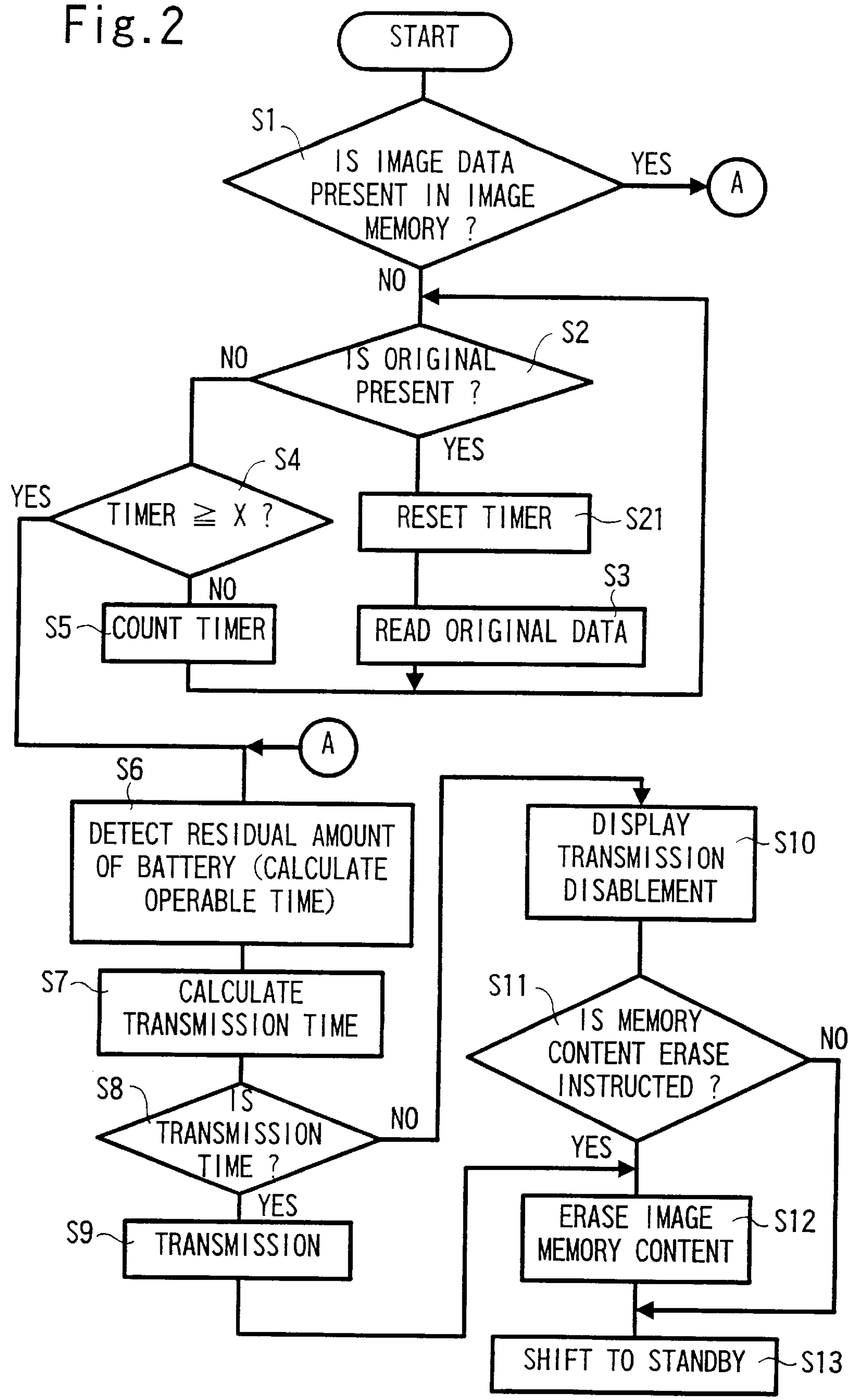
Fig.2
START
S1
IS IMAGE DATA PRESENT IN IMAGE MEMORY ?
YES
A
NO
S2
IS ORIGINAL PRESENT ?
NO
YES
S4
YES
TIMER ≧ X ?
RESET TIMER
S21
NO
S3
S5
COUNT TIMER
READ ORIGINAL DATA
A
S6
DETECT RESIDUAL AMOUNT OF BATTERY (CALCULATE OPERABLE TIME)
DISPLAY TRANSMISSION DISABLEMENT
S10
S7
CALCULATE TRANSMISSION TIME
S11
IS MEMORY CONTENT ERASE INSTRUCTED ?
NO
S8
IS TRANSMISSION TIME ?
NO
YES
YES
S9
TRANSMISSION
ERASE IMAGE MEMORY CONTENT
S12
SHIFT TO STANDBY
S13

41
42
WIRELESS CIRCUIT
43
SPEECH CIRCUIT
49
53
I/O
52
OPERATING SECTION
45
CONTROL SECTION
MEMORY
44
50
DISPLAY SECTION
46
BATTERY
47
BATTERY VOLTAGE DETECTING SECTION
48
51
58
MODEM
CONTROL SECTION
MEMORY
59
57
READING SECTION
54
RECORDING SECTION
55
OPERATING SECTION
56

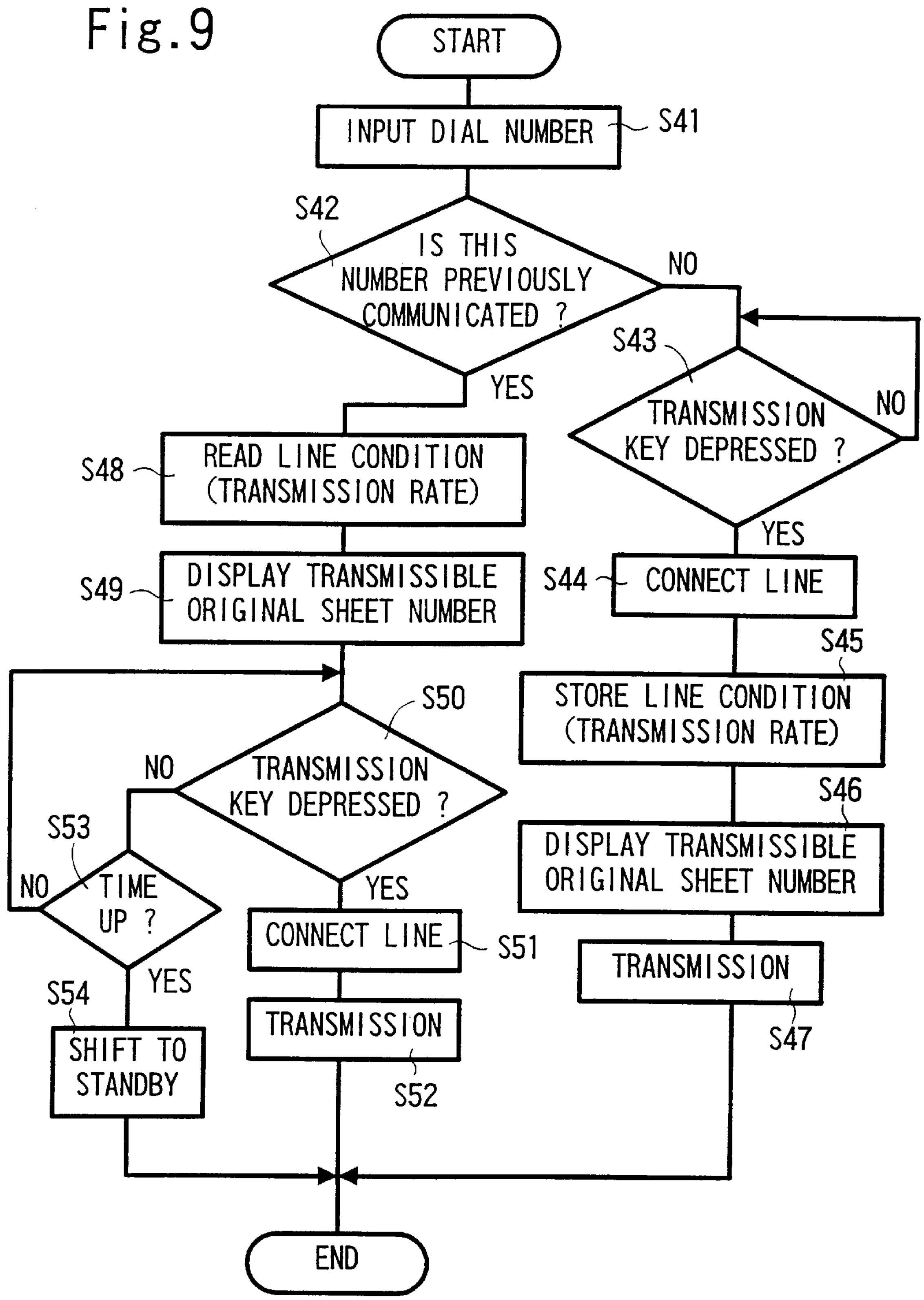
Fig.9
START
INPUT DIAL NUMBER
S41
S42
IS THIS NUMBER PREVIOUSLY COMMUNICATED ?
NO
YES
S43
TRANSMISSION KEY DEPRESSED ?
NO
YES
S48
READ LINE CONDITION (TRANSMISSION RATE)
S49
DISPLAY TRANSMISSIBLE ORIGINAL SHEET NUMBER
S44
CONNECT LINE
S45
STORE LINE CONDITION (TRANSMISSION RATE)
S50
TRANSMISSION KEY DEPRESSED ?
NO
YES
S53
TIME UP ?
NO
YES
S46
DISPLAY TRANSMISSIBLE ORIGINAL SHEET NUMBER
CONNECT LINE
S51
TRANSMISSION
S47
S54
SHIFT TO STANDBY
TRANSMISSION
S52
END 101
102
103
WIRELESS CIRCUIT
104
SPEECH CIRCUIT
114
113
111
112
IF
122
120
MODEM
119
CONTROL SECTION
116
READING SECTION
117
RECORDING SECTION
118
OPERATING SECTION
123
CODING/DECODING PROCESSING SECTION
121
MEMORY
105
CONTROL SECTION
106
OPERATING SECTION
107
DISPLAY SECTION
108
BATTERY
109
BATTERY VOLTAGE DETECTING SECTION
110
EEPROM

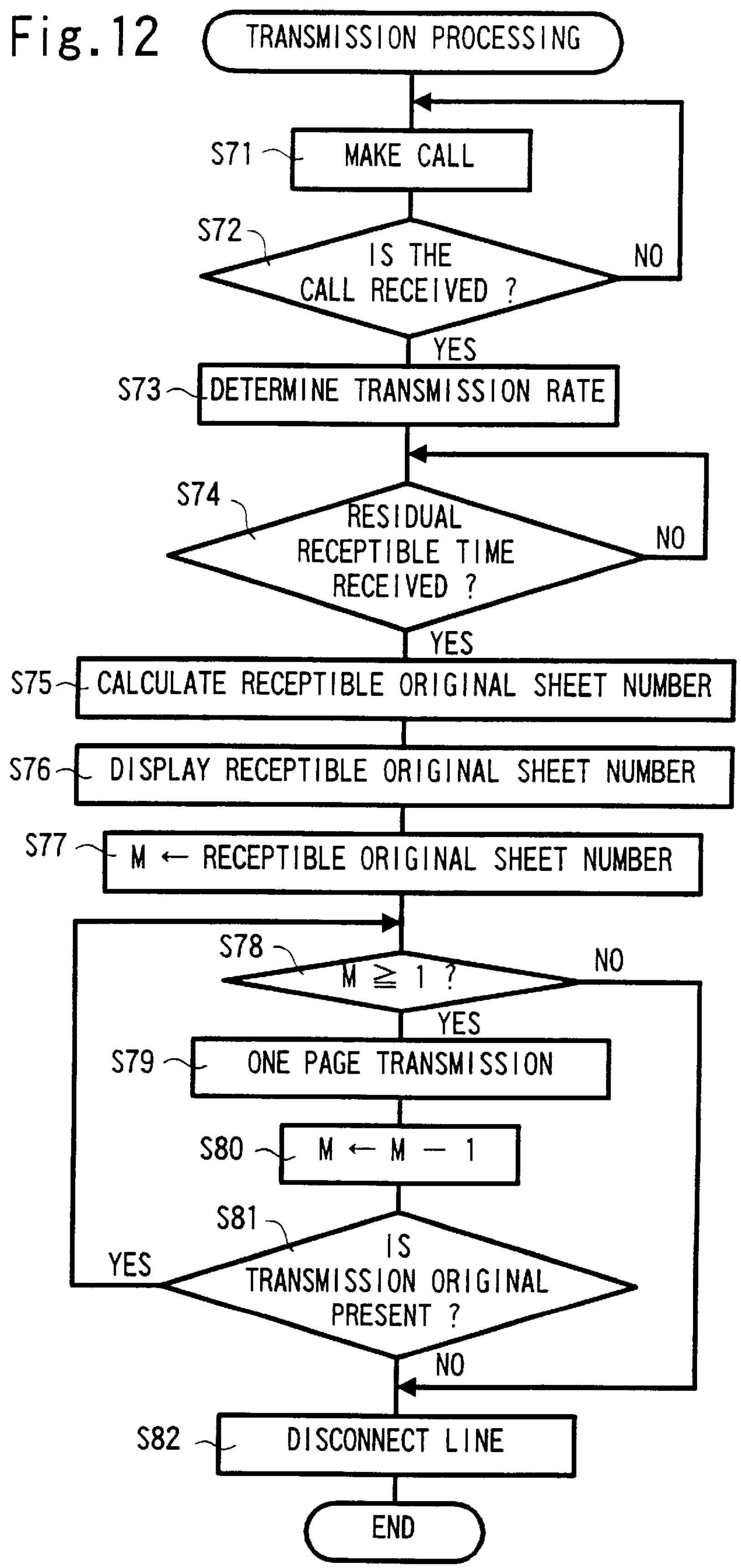
Fig.12
TRANSMISSION PROCESSING
S71
MAKE CALL
S72
IS THE CALL RECEIVED ?
NO
YES
S73
DETERMINE TRANSMISSION RATE
S74
RESIDUAL RECEPTIBLE TIME RECEIVED ?
NO
YES
S75
CALCULATE RECEPTIBLE ORIGINAL SHEET NUMBER
S76
DISPLAY RECEPTIBLE ORIGINAL SHEET NUMBER
S77
M ← RECEPTIBLE ORIGINAL SHEET NUMBER
S78
M ≧ 1 ?
NO
YES
S79
ONE PAGE TRANSMISSION
S80
M ← M − 1
S81
IS TRANSMISSION ORIGINAL PRESENT ?
YES
NO
S82
DISCONNECT LINE
END

PORTABLE COMMUNICATION APPARATUS

BACKGROUND OF THE INVENTION

1. Field of the Invention

The present invention relates to a portable communication apparatus which is operated using a battery as a power source, and more specifically to a portable telephone unit and a portable facsimile unit.

2. Description of Related Art

Recently, a portable telephone unit has been popularized, and further a portable facsimile unit has been contrived in which a transmit-receive function of an image is added to the portable telephone unit. Since such a portable communication apparatus depends on a battery for a power source, it is important to design the portable communication apparatus so as to adequately cope with battery run-out part way through a communication in order to enhance the convenience of such a portable communication apparatus. When the battery run-out occurs during the communication, the line is cut off and the communication operation has to be restarted to connect the line after the battery is replaced.

Particularly, in the portable facsimile unit, if a battery runs out in the middle of transmission after reading the content of an original, accounts are imposed twice for a single original, thus being uneconomical.

For example, European Patent Publication No. EP 536043 discloses an idea in which an image communication apparatus using a battery as a power source is provided with means for alarming a user by an LED or a buzzer that a voltage of the battery has dropped. By this configuration, it is possible to avoid the situation that results in a defective communication due to run-out of power in the battery during the communication.

However, the prior art described in the above publication merely operates when a voltage of a battery drops to a level below a predetermined threshold and the user is alarmed to replace the battery. Accordingly, even after an alarm is made, a possibility remains that a communication of a short content, for example a letter for one or two pages can be transmitted.

Further, since an alarm is merely made, even if such an alarm is made, the user would sometimes operate a facsimile transmission for a relatively large amount of documents. In this case, a battery run-out may occur part way through the communication, resulting in an error of communication. Therefore, in order to avoid an occurrence of communication error caused by the battery run-out, it is necessary to provide a configuration that the alarm as described above be made in the state where a predetermined residual amount of the battery still remains. If so, when a battery is replaced at the time when the alarm as described above is made, waste of the battery increases.

SUMMARY OF THE INVENTION

The present invention has been accomplished in view of the foregoing. It is an object of the present invention to provide a portable communication apparatus which can minimize an occurrence of a battery run-out, or an occurrence of a communication error caused thereby part way through a communication, while suppressing waste of a battery.

For solving the aforementioned problem, according to one aspect of the present invention, there is provided a communication apparatus capable of being operated by a battery, comprising: detection means for detecting a residual amount of the battery; communication means for effecting communication with apparatuses of parties; and control means capable of operating the communication apparatus only when a detection was made by the detection means such that the residual amount of the battery is at least a predetermined level.

According to another aspect of the present invention, there is further provided a communication apparatus capable of being operated by a battery, comprising: detection means for detecting a residual amount of the battery; communication means for effecting communication with apparatuses of parties; conversion means for converting the residual amount of the battery detected by the detection means into information relating to the residual amount; and display means for displaying the thus converted information.

According to another aspect of the present invention, there is still further provided a communication apparatus capable of being operated by a battery, comprising: detection means for detecting a residual amount of the battery; communication means for effecting communication with apparatuses of parties; and response means for informing a mating apparatus of the residual amount of the battery detected by the detection means when received a call from the mating apparatus.

According to another aspect of the present invention, there is provided a communication system for effecting communication between a communication apparatus capable of being operated by a battery and a further communication apparatus, the communication apparatus comprising: detection means for detecting a residual amount of the battery; communication means for effecting communication with the further communication apparatus; and response means for converting the residual amount of the battery detected by the detection means into the number of sheets capable of being received with the residual amount, when received a call from the further communication apparatus, to inform the further apparatus of the number of sheets; the further communication apparatus comprising: control means for controlling, on the basis of the number of sheets capable of being received from the communication apparatus, to transmit images within the number of sheets.

From the above-described explanation, the communication apparatus according to the present invention detects the residual amount of the battery, and only when the residual amount is at least a predetermined amount, the communication means is operated. When the residual amount of the battery is less than the predetermined amount, the communication means is not operated. Accordingly, no communication error caused by the battery run-out occurs during the communication. Further, when no presence of residual amount of the battery is detected, transmission is enabled if the battery is replaced. Therefore, necessary communication is carried out at that time, and additional telephone charges for repeated communication will be eliminated, thus being economical.

The communication apparatus according to another aspect of the invention detects the residual amount of the battery. The detected residual amount of the battery is converted into information relating to the residual amount, and the information is displayed. Therefore, since the operator can recognize the residual amount of the battery, the apparatus is not erroneously driven in excess of the residual battery amount to disconnect the communication part way through.

The communication apparatus according to another aspect of the invention detects the residual amount of the battery, and when a call from the mating apparatus is received, the detected residual battery amount is communicated to the mating apparatus. Therefore, the mating apparatus is informed of the residual amount of the battery on the receiving side. Accordingly, in the case where the residual amount of the battery on the receiving side is small, the transmission side can variously cope accordingly.

In the communication system according to another aspect of the invention, when receiving a call from a sending communication apparatus, the battery operated communication apparatus detects the residual amount of the battery, converts the residual amount of the battery into the number of receptible sheets, and informs the sending communication apparatus of the number of sheets. The sending communication apparatus transmits images within the number of receptible sheets in accordance with the response from the communication apparatus. Thereby, the communication apparatus on the receiving side is free from an occurrence of the situation in which reception stops part way through a page due to the run-out of the battery. Accordingly, the sending communication apparatus on the transmission side can save trouble that a page for which reception is stopped halfway is transmitted once again, thus saving waste of time and charges.

BRIEF DESCRIPTION OF THE DRAWINGS

Preferred embodiments of the present invention will be described in detail with reference to the following figures, wherein:

FIG. 2 is a flowchart showing the operation of the first embodiment;

FIG. 9 is a flowchart showing the operation of the communication apparatus according to the third embodiment;

FIG. 12 is a flowchart showing the transmission processing operation of the portable communication apparatus according to the fourth embodiment.

DETAILED DESCRIPTION OF THE PREFERRED EMBODIMENTS

First, a first embodiment will be described with reference to FIGS. 1 to 3.

Figure 1:
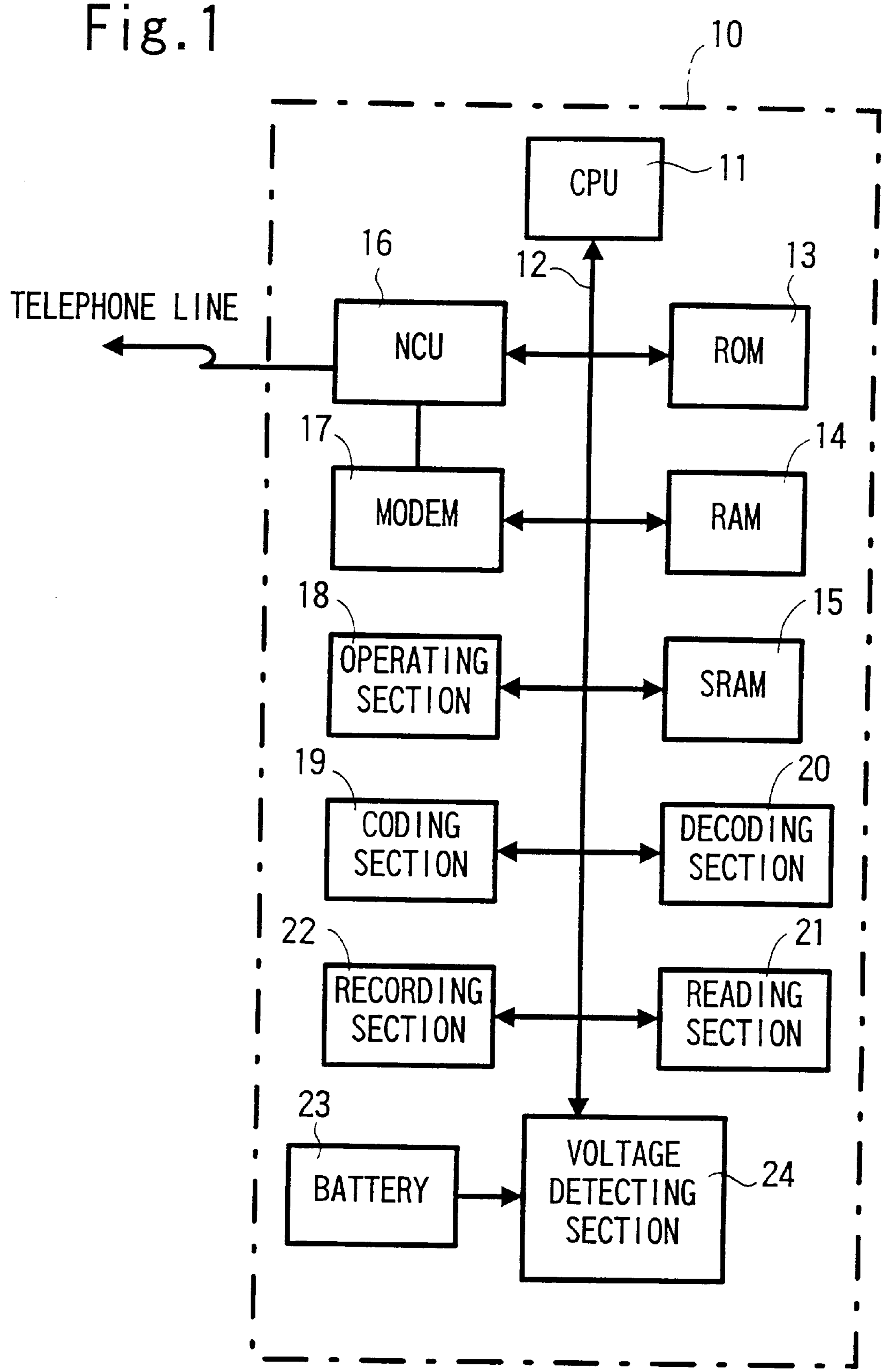
FIG. 1 is a block diagram showing the construction of a portable facsimile unit according to a first embodiment.

FIG. 1 is a block diagram showing a main construction of one example of a portable facsimile unit 10. To a central processing unit (CPU) 11 are connected, through a bus line 12, a ROM 13, a RAM 14, a nonvolatile RAM (SRAM) 15, a network control unit (NCU) 16, a modem 17, an operating section 18, a coding section 18, a decoding section 20, a reading section 21, a recording section 22, a voltage detecting section 24 and a battery 23.

The ROM 13 contains a control program performed by the CPU 11. The RAM 14 temporarily stores data when the CPU 11 performs various controls. The SRAM 15 functions as an image memory for storing image data read by the reading section 21. Since this SRAM 15 is a nonvolatile memory, it can hold image data even if a power source is cut off for replacement of a battery. The NCU 16 sets up a communication line with respect to a mating facsimile unit. The modem 17 modulates a transmission signal into a mode suitable for transmission by a telephone line when image data is transmitted, and demodulates a modulation signal being sent from a telephone line when receiving image data from a mating facsimile unit.

The operating section 18 is provided with ten keys or various switches for functions such as user command input or an LCD for displaying information. The coding section 19 compresses the image data read by the reading section 21 to a predetermined form to code it. The decoding section 20 restores image data transmitted from the mating facsimile unit from a compressed state to normal-state image data. The reading section 21 is provided with a document table on which a document page is placed and a CCD to read the document page set on the document table. The reading section 21 is further provided with a document sensor for detecting the presence of a document page. The recording section 22, a thermal printer for example, prints on a recording sheet in accordance with image data. The facsimile unit 10 is designed so as to be operated by the battery 23, and the voltage detecting section 24 for detecting an output voltage of the battery 23.

In the portable facsimile unit 10 according to the first embodiment, in the transmission operation, image data read by the reading section 21 is once retained in the SRAM 15. Then, judgment is made whether or not all the image data retained in the SRAM 15 can be transmitted in relation to the residual amount of the battery 23. If the transmission is judged possible, the transmission operation is effected, and if not, the transmission operation is not effected, and after replacement of the battery, the transmission can be made.

The details of the above operation will be described hereinafter with reference to the flowchart of FIG. 2. After the power source is turned on, the CPU 11 executes the operation described below in accordance with the program stored in the ROM 13.

First, in step S1, judgment is made whether or not image data is retained in the SRAM 15. Here, the retainment of image data within the SRAM 15 (S1: YES) means that in the previous transmission operation, the transmission was disabled due to insufficient amount of power in the battery 23 after a document page has been read by the reading section 21. In this case, in the present embodiment, the data retained in the SRAM 15 is automatically transmitted, the operation of which will be described later.

In the case where image data is not retained in the SRAM 15 (S1: NO), judgment is made by the document sensor whether or not a document page is present on the document table of the reading section 21 (S2). In the case where a document page is present (S2: YES), a timer (not shown) is reset, and a document page image is read by the CCD of the reading section 21 (S3) to produce image data. This image data is converted into a Modified Huffman (MH) code by a predetermined compression method, for example, and is stored in the compressed state into the SRAM 15. In the case where a document page is not present (S2: NO), judgment is made whether the counting by the timer has passed for a predetermined time (S4). If not, (S4: NO), the counting is continued (S5) and the presence of a document page is checked again (S2). When the counting by the timer has passed after a predetermined time and a document page has not been placed on the document table (S4: YES), the procedure proceeds to the next operation.

The procedure waits for a predetermined time for a document page to be placed on the document table because, in relation to the number of document pages capable of being received in the document table provided in the reading section 21, after all the documents initially set on the document table have been read, the user sometimes continuously sets new document pages on the document table. That is, in the case where no document page is still present on the document table (S4: YES) even after the passage of a predetermined time after the initial judgment where no document page is present (S2: NO), judgment is made such that all the document pages to be transmitted have been read and stored in the SRAM 15 at the time when a predetermined time has passed. Then, the procedure proceeds to the next operation.

When the image data of the thus read document pages are stored in the SRAM 15, the residual amount of power in the battery 23 is detected by the voltage detection section 24 (S6). At this time, an output voltage of the battery 23 is detected, and the time capable of continuously operating the NCU 16 is determined.

When the NCU 16 is continuously operated, the output voltage of the battery 23 is gradually lowered. The voltage-value drop curve of the battery 23 when the battery 23 is continually discharged with a constant current can be experimentally obtained. When the facsimile unit performs its transmission operation assuming that the image data are stored, the NCU 16 principally consumes power, and a current value necessary for operating the NCU 16 is also known. Accordingly, how long the NCU 16 can be normally operated continuously can be known experimentally on the basis of the voltage value of the battery 23, and the operable time of the NCU 16. This experimentally obtained data can be stored as a table in the ROM 13 having the continuous operation time of the NCU 16 as a function of the voltage value of the battery 23. That is, in step S6, how long the facsimile unit 10 can transmit (the operable time of the facsimile unit) is determined by detecting the current voltage value of the battery 23 and referring to the table within the ROM 13.

Next, the transmission time necessary for transmitting the image data retained in the SRAM 15 is determined (S7). The transmission time can be obtained by dividing the amount of image data stored in the SRAM 15 upon completion of the MH coding by the communication rate (for example, 9600 BPS). The concrete content of the transmission-time computation will be described later. In Japan, in most cases, the communication at 9600 BPS is possible (in case of G3 FAX), and it is reasonable that the communication rate used for operation is 9600 BPS. However, considering that poor line conditions are expected, 4800 BPS or the like can be selected. The transmission time can be determined in a manner such that the relationship between the telephone number of the mating party for transmission and the communication rate is stored as the past communication experience in an EEPROM. The past communication experience is referred to on the basis of the telephone number of the mating party for transmission. When transmitting to an identical telephone number that was used in the past, the communication rate data is read and the transmission time using a proper transmission rate according to the mating party for transmission is determined.

In step S8, judgment is made whether or not the image data stored in the SRAM 15 can be transmitted. If the transmission time obtained in step S7 is shorter than the facsimile operable time obtained in step S6, then judgment is made that the transmission is possible (S8: YES) and the transmission is allowed. Then, the procedure shifts to the step in which the facsimile unit is ready for operation of transmission (S9). If the transmission time is longer than the facsimile operable time, then judgment is made that the transmission is impossible (S8: NO), and the disablement of transmission is displayed on the LCD of the operating section 18 (S10).

Next, in the case where the user, through key input operations, instructs that the content of the image memory 15 be erased (S11: YES), the erasure of the image memory 15 is performed (S12). In the case where such an input is not made (S11: NO), the procedure shifts to the standby state while retaining the image data within the image memory 15 (S13).

The display of the transmission disablement in step S10 includes a display "Since the residual amount of power in the battery is small, no transmission is made. Please replace the battery."

The user normally replaces the battery in accordance with the above-described display, and once again turns on the power source of the facsimile unit. In this case, the response in step S1 is YES and the processes in and after step S6 are executed for the transmission operation. Since a new battery is present, normally, the transmission can be made without any problem.

In this case, if the mating telephone number input at the transmission operation before replacement of the battery is stored in the SRAM 15, the image data stored in the image memory 15 before the battery is replaced can be automatically transmitted. Further, while in the present embodiment, the read image data have been stored in the SRAM 15, it is to be noted that the RAM 14 can be backed up by a small battery to store image data in the RAM 14. In this case, the SRAM 15 is not necessary but a new small battery is necessary.

Figure 3:
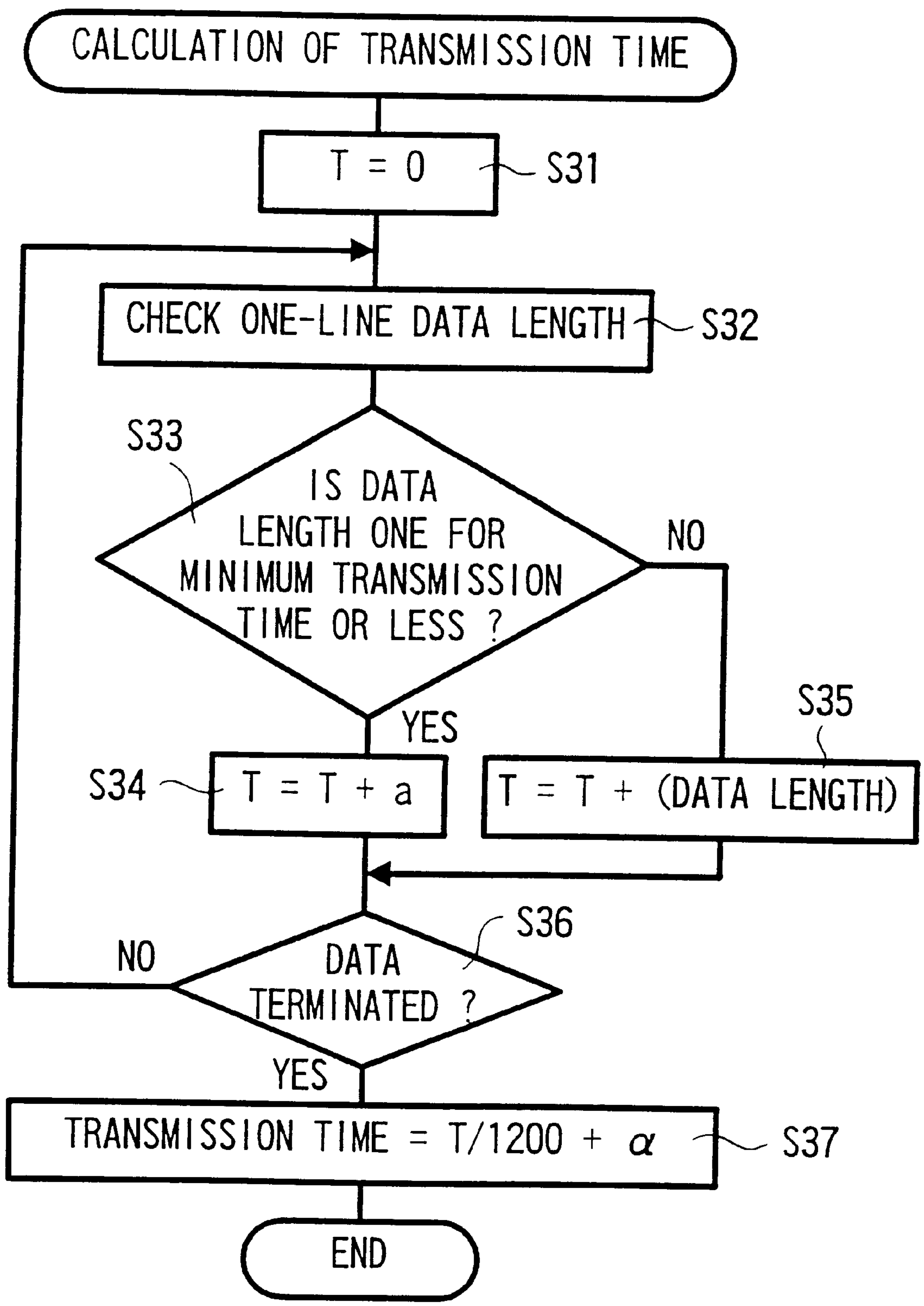
FIG. 3 is a flowchart showing the method for counting communication time in the first embodiment.

Computation of the transmission time in step S7 shown in FIG. 2 is more specifically performed as shown in the flowchart of FIG. 3.

First, in step S31, the total data number T is initialized to 0, and after this, the length of data for one line compressed to the MH code is checked (S32). Next, judgment is made whether or not the length of data for one line is one for the minimum transmission time or less (S33). If the data length is one for the minimum transmission time or less (S33: YES), the byte number "a" (constant value) fulfilling the minimum transmission time for one line is added to the above-described total data number T (S34). In the facsimile transmission, since data is transmitted every line, even if data within one line is small, a given time is necessary for transmitting data of one line. In this case, assuming that the minimum transmission time is for example 20 ms, when the transmission rate is 9600 BPS, the above "a" is 24 bytes. If the minimum transmission time is exceeded in step S33

(S33: NO), the length of data checked in step S32 is added to the total data number T (S35). The incrementing operation of the total data number T is repeated till data termination (S36), and the total data number T is finally decided. The total data number is divided by the communication rate (9600 to obtain the transmission time (S37) BPS=1200 bytes/s) and an anticipated time α is added to obtain the transmission time (S37). The anticipated time a is the time necessary for the NCU 16 to perform the communication procedure when a call is made.

As described above, according to the first embodiment, when the residual amount of power in the battery 23 is less than the battery power amount necessary for transmitting the image data stored in the SRAM 15 at present, the transmission of the image data is not effected. Therefore, there occurs no situation in which the residual amount of power in the battery 23 becomes insufficient during a transmission to stop the transmission of the image data part way through. Thereby, the retransmission operation induced by the situation just mentioned above is unnecessary, and the operability is enhanced. Further, because retransmission is not necessary, the cost of retransmission is eliminated.

Further, even if the battery 23 is replaced when the residual amount of power in the battery 23 is low, the image data is stored in the SRAM 15 and not erased. By turning on the power source after the battery 23 has been replaced, the stored image data is automatically transmitted, thus good operability is provided.

A second embodiment in which the present invention is applied to a portable wireless telephone unit 41 will be described with reference to FIGS. 4 to 7.

Figure 4:
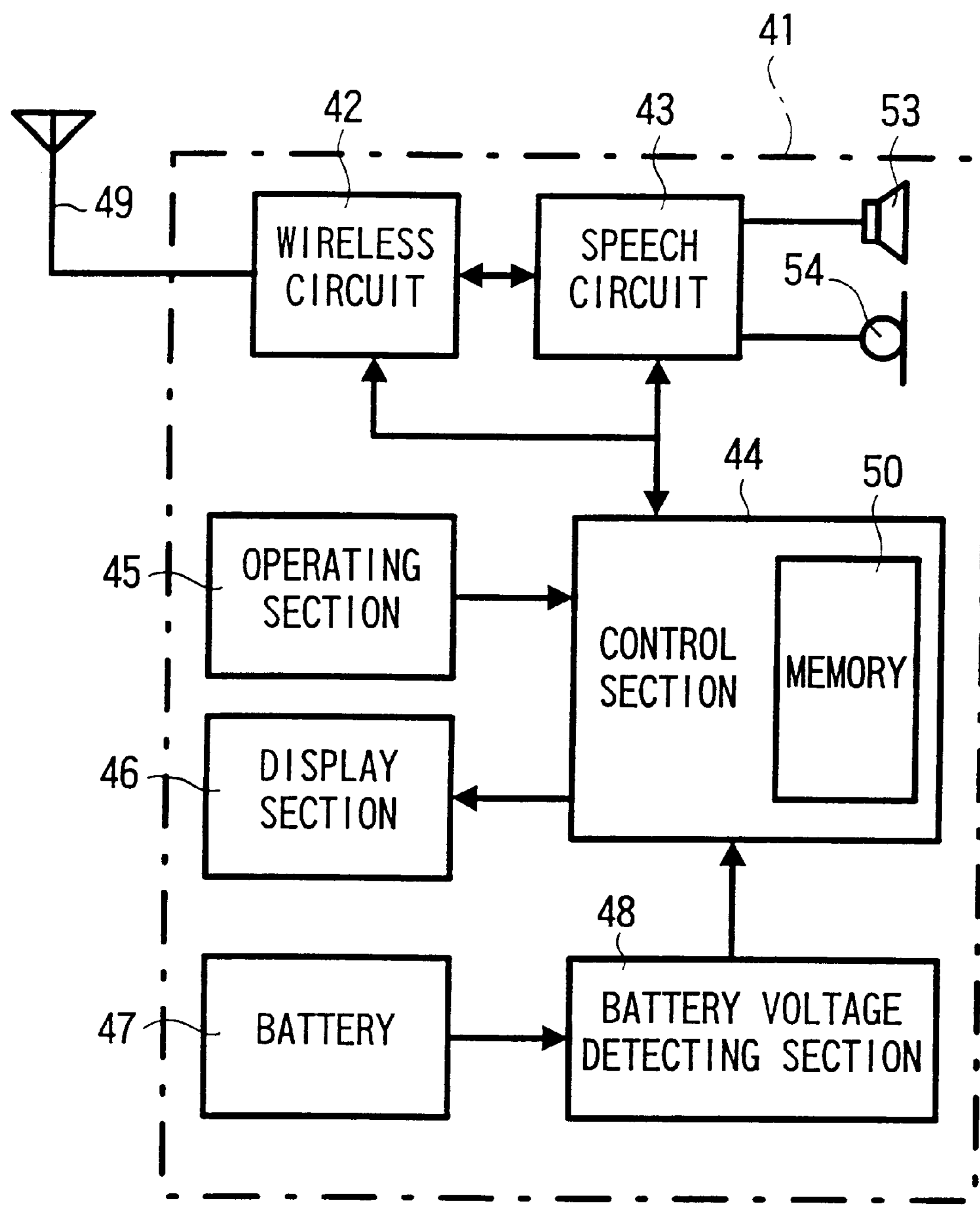
FIG. 4 is a block diagram showing the construction of a portable wireless telephone unit according to a second embodiment.

As shown in FIG. 4, the portable wireless telephone unit 41 comprises a wireless circuit 42, a speech circuit 43, a control section 44, an operating section 45, a display section 46, a battery 47 and a battery voltage detecting section 48.

Figure 5:
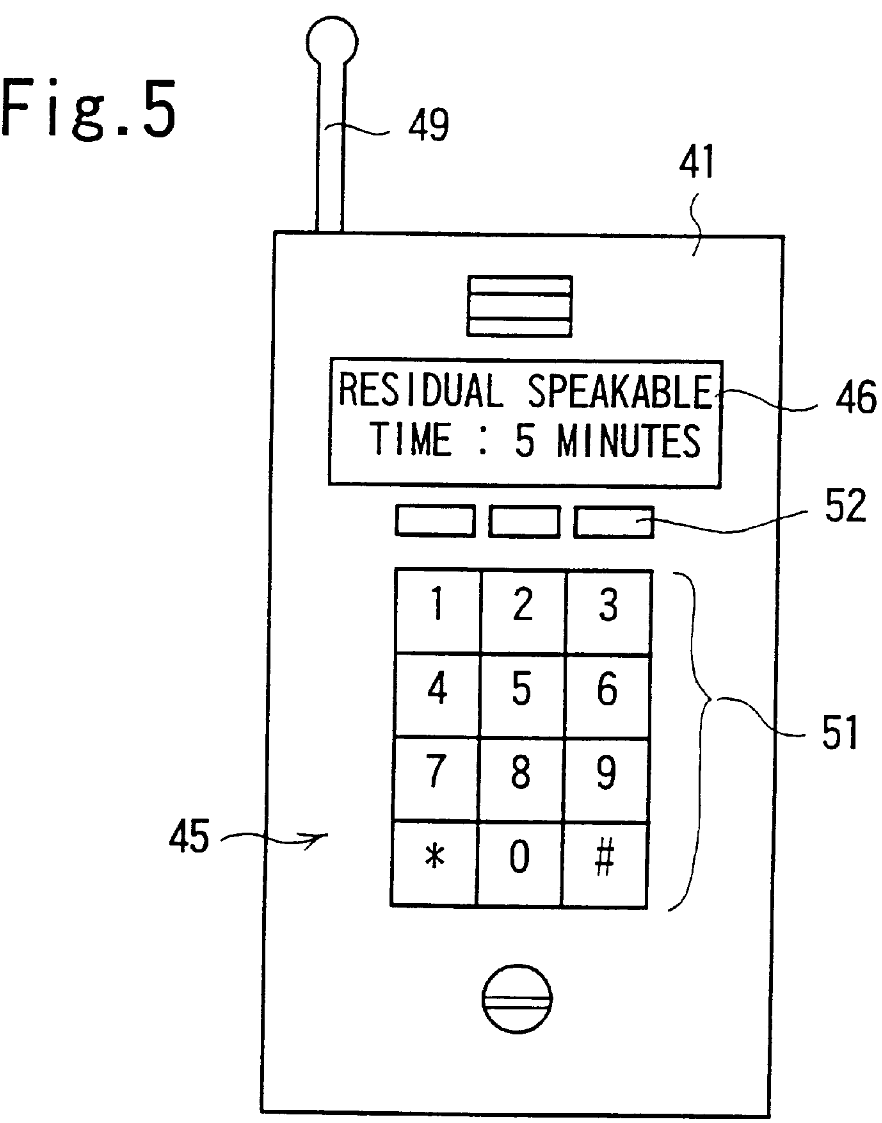
FIG. 5 is an external view of the portable wireless telephone unit according to the second embodiment.

This portable wireless telephone unit 41 is designed to be driven by the battery 47. As the battery 47, a dry cell is normally used, but a chargeable battery pack can be also used. An antenna 49 is connected to the wireless circuit 42. The antenna 49 performs the conversion between a wireless frequency signal output from the wireless circuit 42 and an electric wave. The speech circuit 43 delivers and receives a voice signal between a speaker 53 and a microphone 54. The operating section 45 is composed of a dial key 51, a residual time display key 52 and the like, as shown in FIG. 5. The display section 46 is composed of an LCD as shown in FIG. 5. The control section 44 has a CPU, which controls the entire apparatus. The control section 44 is provided with a suitable memory 50, in which are set abbreviated dial numbers and recorded telephone numbers of mating parties previously transmitted.

On the display section 46 are normally displayed a dial number of a mating party when issuing a call and a telephone number of a mating party when receiving a call. In addition to the above-described display function, in the portable wireless telephone unit 41 according to the present embodiment, the residual speakable time corresponding to the residual amount of power in the battery 47 is displayed as in "Residual speakable time: 5 minutes" as shown in FIG. 5.

The method for calculating the speakable time will be described in detail.

The speakable time is obtained by the control section 44 on the basis of battery-voltage information from the battery voltage detecting section 48 or the discharge characteristics of the battery 47 used and displayed on the display section 46. The residual speakable time can be obtained in the following manner. The discharge characteristics of the battery are generally expressed as in the graph of FIG. 7. That is, the voltage drops with constant characteristics as the discharge continues.

The discharge capacity at a predetermined voltage V can be expressed f(V)=YmAh as a function of voltage V where mA is current and h is time. Since the value of the above Y corresponding to the voltage value V from the initial voltage value to the speakable minimum voltage (reset voltage) can be experimentally obtained, a data table representative of the V-Y relation is stored in advance in the memory 50. Let bmA be the consumption current necessary at the time of speech, the discharge capacity YmAh is divided by the consumption current bmA whereby the residual speakable time Xh can be calculated. Accordingly, by detecting the voltage of the battery 47, the residual speakable time in the case where the battery 47 is continuously used can be obtained.

In the reception waiting state of the portable wireless telephone unit 41, the residual speakable time is displayed by depressing the residual time display key 52 provided on the operating section 45. In the speech state, the automatic display can be also made by the control section 44 from the time when the residual speakable time falls below 10 minutes, for example. Further, in the case where the residual speakable time falls below 10 minutes during the speech, a small alarm sound is sent to the speaker 53 by the control section 44.

Figure 6:
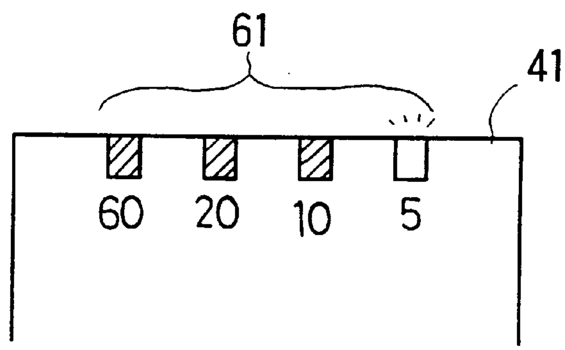
FIG. 6 is a view showing an example of a display section for displaying the time for residual communication in the portable wireless telephone unit according to the second embodiment.
Figure 7:
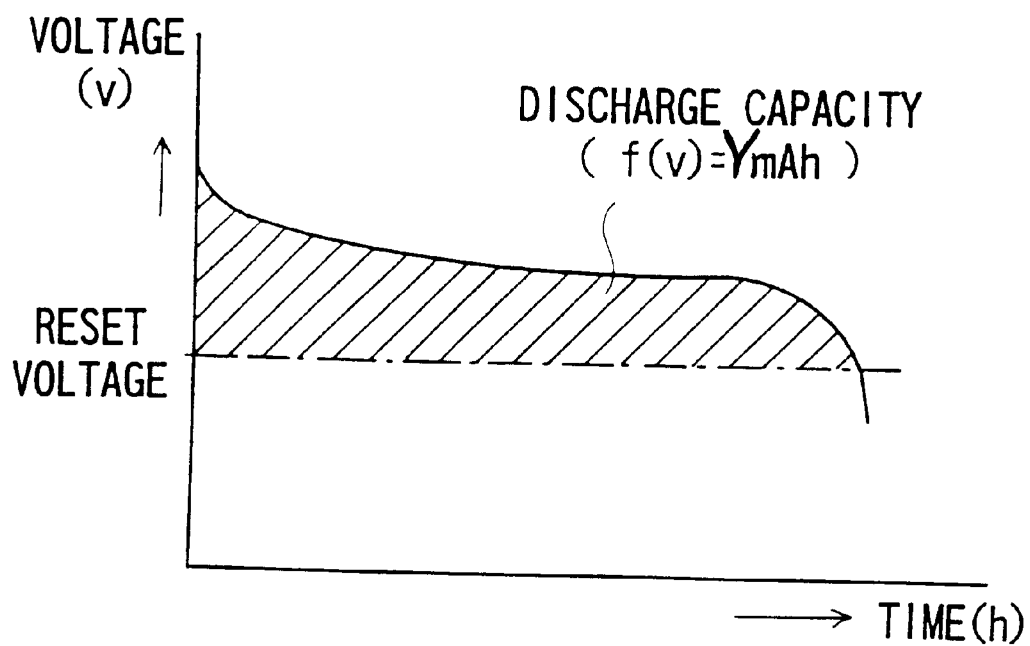
FIG. 7 is a view showing the discharge characteristics of a battery used in the portable wireless telephone unit according to the second embodiment.

As the display section 46 for displaying the residual speakable time, the LCD display can be used to display letters or characters as described above. In addition, for example, as shown in FIG. 6, a plurality of LEDs 61 are arranged on suitable portions of the body of the portable wireless telephone unit 41 along with numerical displays indicating the residual speakable time respectively, whereby any of LEDs may be lit to thereby roughly display the residual speakable time. In an example shown in FIG. 6, four LEDs 61 in total are provided which are lit at the time when the residual time falls below 60 min., 20 min., 10 min. and 5 min., respectively.

Figure 8:
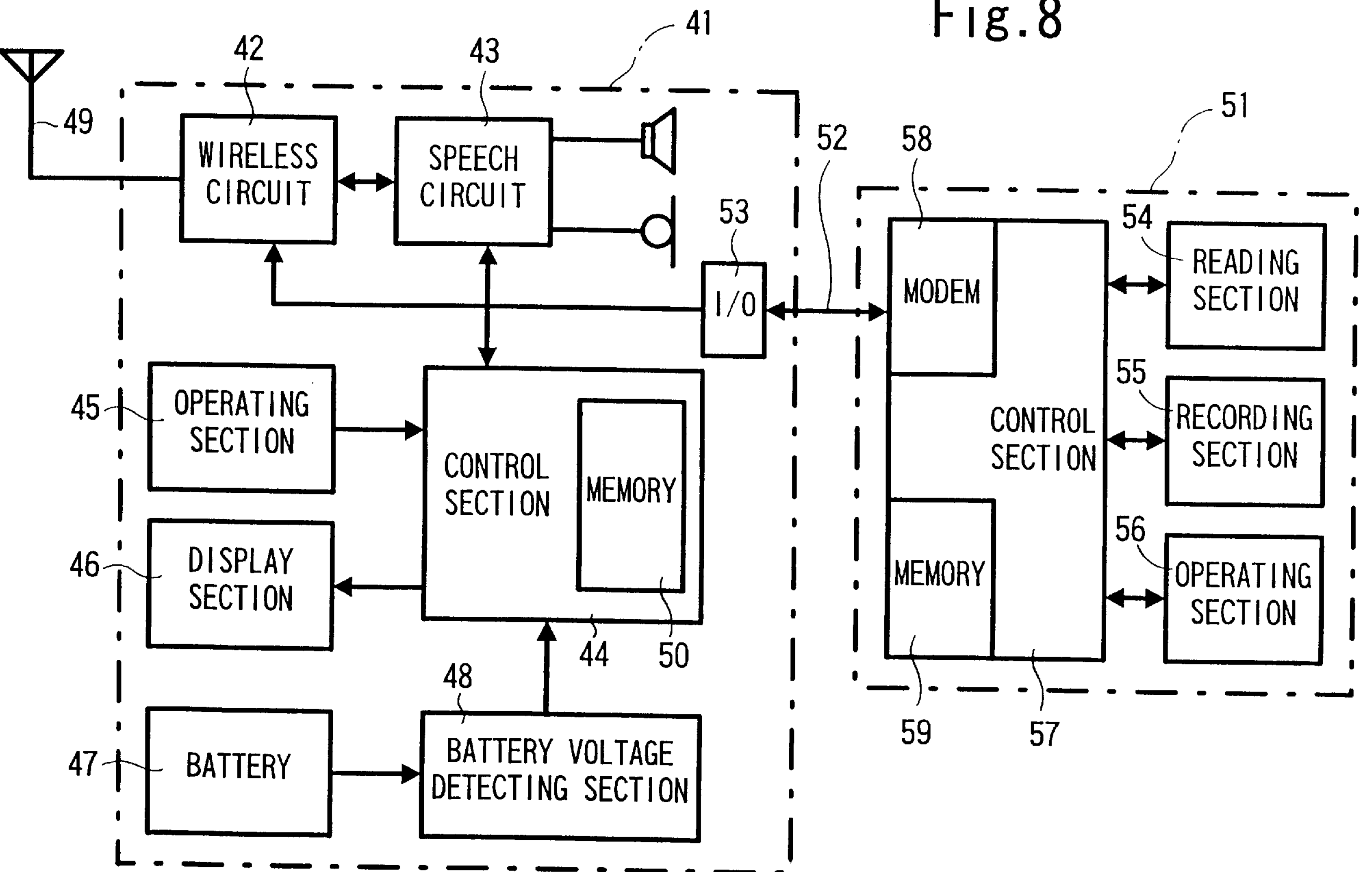
FIG. 8 is a block diagram showing the construction of a communication apparatus according to a third embodiment.

Next, a third embodiment of the present invention will be described with reference to FIGS. 8 and 9.

In the third embodiment, a facsimile unit 51 is connected to the aforementioned portable wireless telephone unit 41 operated by the battery 47 as a power source to perform facsimile communications.

Since the portable wireless telephone unit 41 in the third embodiment has already been described, the detailed description thereof is omitted. This portable wireless telephone unit 41 is provided with an I/O port 53 for connecting the facsimile unit 51 through a connection cable 52 as necessary.

The facsimile unit 51 basically comprises a reading section 54, a recording section 55, an operating section 56 and a facsimile control section 57 for controlling the just mentioned sections. The facsimile control section 57 is interiorly provided with a modem 58 and various memories 59 as necessary to code or decode data, and modulate data for reception and transmission. In the memory 59 is registered an abbreviated dial numbers of mating parties for transmission by the facsimile unit 51 and is recorded telephone numbers of mating parties with whom transmission was performed in the past. Since the basic operation of these constituent elements is the same as that of the facsimile unit in the first embodiment, and the detailed description thereof is omitted.

As the power source for the facsimile unit 51, a battery or a commercial power source is used. The battery 47 of the portable wireless telephone unit 41 can be used.

One example of the operation of the apparatus according to the third embodiment will be described with reference to the flowchart of FIG. 9.

The portable wireless telephone unit 41 detects that the facsimile unit 51 is connected to the I/O port 53 to thereby constitute a facsimile transmission mode. While the apparatus comprising the portable wireless telephone unit 41 and the facsimile unit 51 connected with each other is basically controlled by the control section 44 within the portable wireless telephone unit 41, it is to be noted that a part or the whole of the control can be performed by the control section 57 within the facsimile unit 51.

First, when a dial number of a mating party is input from the dial key 51 of the operating section 45 of the portable wireless telephone unit 41 (S41), the memories 50 and 59 are searched to judge whether or not the dial number has been a communication mating party in the past (S42). In case of a new dial number (S42: NO), the wireless circuit 42 of the portable wireless telephone unit 41 performs the connection operation of the circuit (S44) on the condition that the transmission key arranged on the operating section 56 on the side of the facsimile unit 51 is depressed (S43: YES). As is known, in the facsimile communication, the transmission rate is determined while adjusting to the characteristics of the facsimile unit of the mating party at the time of line connection. The thus determined transmission rate is stored in the memories 50 and 59 corresponding to the dial number input (S45). For these memories, the memory 50 on the side of the portable wireless telephone unit 41 may be used, or the memory 59 on the side of the facsimile unit 51 may be used.

Subsequently, for example, the number of transmissible sheets of a A4-size document page having a standard image density, that is, the residual number of transmissible sheets is obtained from the residual amount of power in the battery 47 of the portable wireless telephone unit 41, the transmission rate corresponding to the dial number, and the resolution of the transmission image, which number is displayed on the display section 46 as in "Transmissible sheet number: 10" (S46).

For example, the number of transmissible document pages is obtained by obtaining the residual communicable time from the residual amount of power in the battery 47 as mentioned in the second embodiment, and by dividing the thus obtained time by the time necessary for transmitting the standard A4-size document page at the transmission rate determined as described above in a predetermined resolution. After the aforesaid number of transmissible document pages has been displayed on the display section 46 (S46), the procedure shifts automatically to the transmission operation (S47). In the case where the number of document pages to be transmitted exceeds the displayed number of transmissible document pages, for example, the user depresses the stop key to stop the entire apparatus.

The time necessary for transmitting a sheet of a standard document is determined according to the resolution of the transmission image (that is, a photo mode, a superfine mode, a fine mode and a normal mode) and the line situation such as a transmission rate and a compression method, and these data are stored in the memory 50 or the memory 59.

On the other hand, in the case where the dial number input in step S41 is a number previously communicated (S42: YES), the transmission rate corresponding to the dial number is read from the memory 50 or the memory 59 (S48), and the residual number of transmissible document pages is obtained from the residual amount of power in the battery 47 of the portable wireless telephone unit 41 and the transmission rate thereof and is displayed on the display section 46 (S49). Then, the wireless circuit 42 performs the line connection operation (S51) on the condition that the transmission key is depressed (S50: YES). The procedure then shifts to the transmission operation (S52). If the transmission key is not depressed during a given time (S50: NO, S53: YES), the apparatus shifts to the standby state (S54) without the line connection. In the case where the user confirms the residual number of transmissible document pages displayed in step S49 and all the document pages to be transmitted can be transmitted, the user depresses the transmission key, and if the transmission cannot be made, the user does not depress the transmission key or depress the stop key to stop the apparatus. In the case of the mating party previously communicated as described above, judgment can be made whether all the document pages to be transmitted can be transmitted without connection of the line when the dial number is input. Therefore, it is possible to avoid wasteful imposition of telephone charges.

A fourth embodiment according to the present invention will be described below with reference to FIGS. 10 to 12.

Figure 10:
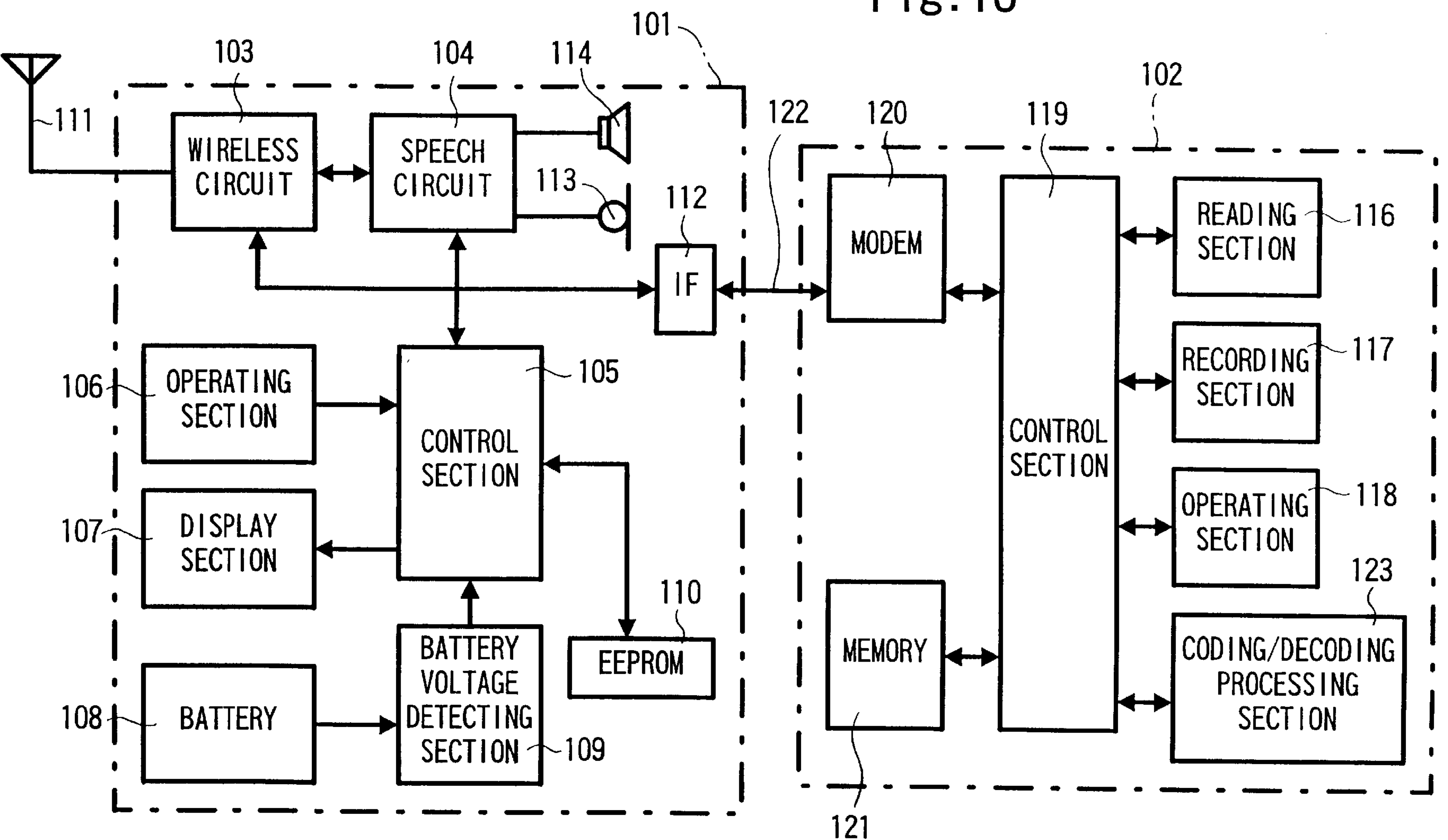
FIG. 10 is a block diagram of a portable communication apparatus according to a fourth embodiment.
Figure 11:
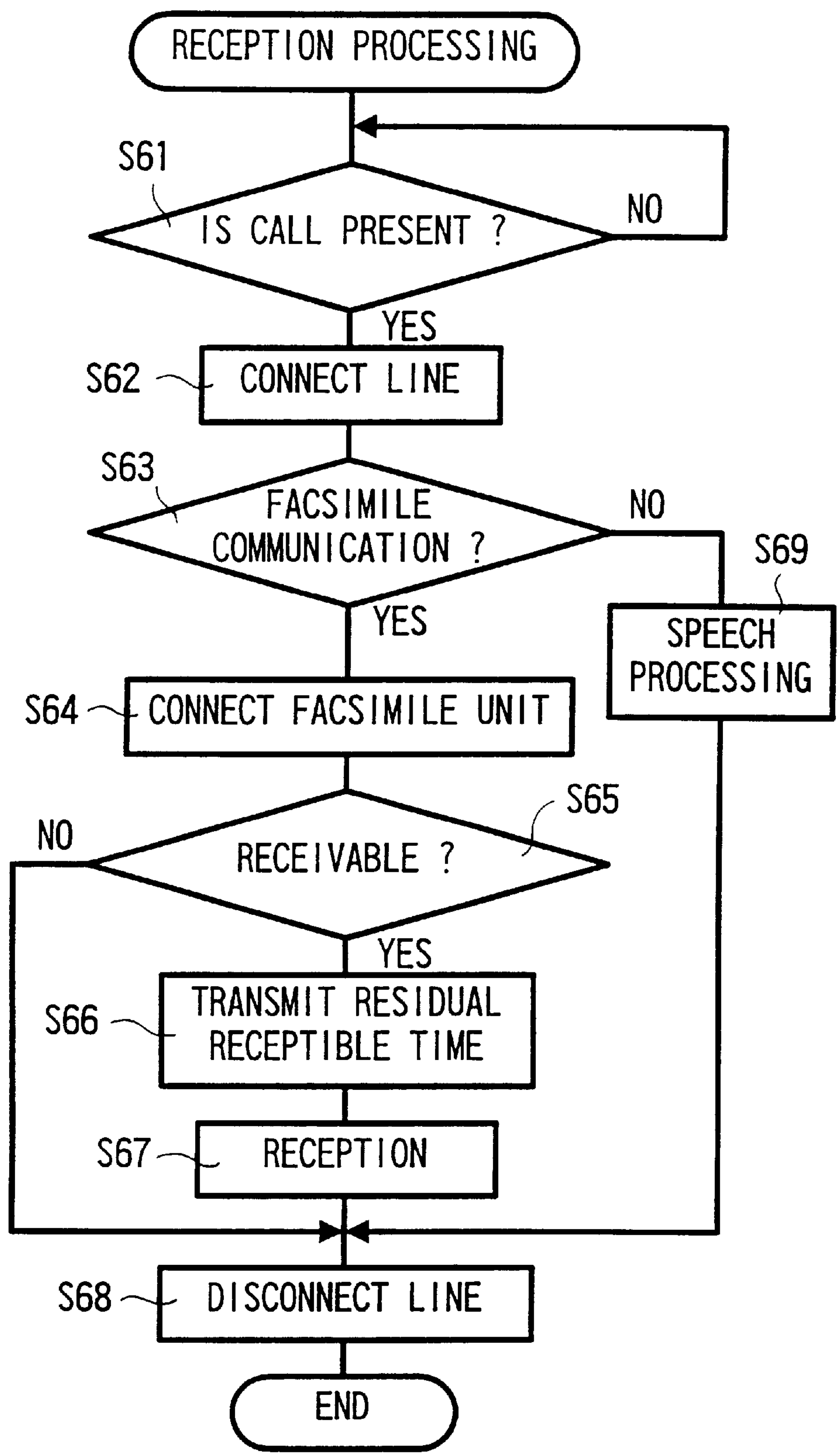
FIG. 11 is a flowchart showing the reception processing operation of the portable communication apparatus according to the fourth embodiment.

FIG. 10 is a block diagram of the circuit of a portable communication apparatus according to the fourth embodiment. This portable communication apparatus comprises a portable wireless telephone unit 101 and a facsimile unit 102. The portable wireless telephone unit 101 comprises a wireless circuit 103, a speech circuit 104, a control section 105, an operating section 106, a display section 107, a battery 108, a battery voltage detecting section 109, an EEPROM 110, an antenna 111, an interface 112 for connection of a facsimile unit, a microphone 113 and a speaker 114. The facsimile unit 102 comprises a reading section 116, a recording section 117, an operating section 118, a control section 119, a modem 120, a memory 121 and a coding/decoding processing section 123.

The portable wireless telephone unit 101 is driven by the battery 108 as a power source and delivers and receives information with respect to other portable wireless telephone units by wireless. The facsimile unit 102 makes use of the portable wireless telephone unit 101 to perform image communication with other facsimile units. This facsimile unit 102 may use a battery as a power source or a commercial power source as a power source.

Alternatively, the power from the battery 108 of the portable wireless telephone unit 101 may be received. The wireless circuit 103 delivers and receives a wireless frequency signal to and from the antenna 111. The speech circuit 104 delivers and receives a voice signal between the microphone 113 and the speaker 114.

The control section 105 comprises a CPU and the like to control the entire portable wireless telephone unit 101. The operating section 106 comprises a group of key switches and outputs a signal corresponding to the operation of the user such as a dial input to the control section 105. The display section 107 comprises a liquid crystal display unit, which is controlled by the control section 105 to display various information such as dial input from the operating section 106.

The battery 108 is a power source for the portable wireless telephone unit 101. The battery 108 may be a dry cell or a chargeable battery pack. The battery voltage detecting section 109 detects an output voltage of the battery 108. The EEPROM 110 stores the relation between the output voltage of the battery 108 and the residual receptible time.

The antenna 111 converts an electric wave to a wireless frequency signal and vice versa. The interface 112 for connection of a facsimile unit is an interface for connection with the facsimile unit 102, which interface is connected to the modem 120 of the facsimile unit 102 through a predetermined cable 122. The microphone 113 converts a voice of the user into an electric signal. The speaker 114 converts an electric signal into a voice.

The reading section 116 of the facsimile unit 102 is provided with a CCD and the like, and reads a document page to output an image signal corresponding thereto. The recording section 117 is provided with a laser printer or a thermal printer to record on a recording sheet characters or figures based on the image signal decoded from received data. The operating section 118 comprises a group of key switches to output a signal corresponding to the operation of the user to the control section 119. The control section 119 is provided with a CPU and the like to control the entire facsimile unit 102. The modem 120 modulates transmit data and demodulate receive data. The memory 121 is composed of a RAM and the like to store image data read from a document page and data for recording by the recording section 117. The coding/decoding processing section 123 performs the decoding process of receive data being compressed, and the coding process for compressing image data into transmit data.

The receive processing operation and transmit processing operation of the portable communication apparatus constructed as described above will be described with reference to FIGS. 11 and 12. FIG. 11 shows the receive processing operation, and FIG. 12 show the transmit processing operation. Here, a description is made in which the portable communication apparatuses constructed as described above perform the image communications.

In the portable communication apparatus on the receiving side, first, the control section 105 of the portable wireless telephone unit 101 judges whether or not there is a call from the portable communication apparatus on the transmission side on the basis of information from the wireless circuit 103 (S61). If a call is present (S61: YES), the line is connected (S62) to judge whether or not it is facsimile communication (S63). If so (S63: YES), the facsimile unit 102 is placed active through the IF 112 to deliver the control to the control section 119 of the facsimile unit 102 (S64). Subsequently, the control section 119 of the facsimile 102 judges whether or not the reception is enabled (S65). In the case of the state where the facsimile unit 102 can record receive data by the recording section 117 or the state where the memory intercepting for storing receive data in the memory 121 is enabled, judgment is made such that the reception is enabled.

If the reception is enabled (S65: YES), the control section 119 of the facsimile unit 102 requests the control section 105 of the portable wireless telephone unit 101 to transmit the residual receptible time to the transmission side, whereby the control section 105 of the portable wireless telephone unit 101 transmits the residual receptible time to the transmission side through the wireless circuit 103 (S66).

The residual receptible time is obtained in the following procedure.

The control section 105 of the portable wireless telephone unit 101 reads the detected voltage from the battery voltage detecting section 109 for detecting the voltage of the battery 108, retrieves the EEPROM 110 on the basis of the detected voltage, reads the residual receptible time corresponding to the detected voltage, and transmits the time to the transmission side. The relation between the residual amount and output voltage of the battery 108 can be experimentally obtained, and the relation between the residual amount of power in the battery 108 and the residual receptible time, that is, the receive operation continuable time till power in the battery runs out can be also experimentally obtained. Therefore, the relation between the voltage of the battery 108 and the residual receptible time can be obtained in advance. The relation between the voltage of the battery 108 and the residual receptible time is stored in the EEPROM 110 in the form of a table so that it can be retrieved on the basis of the voltage of the battery 108. Accordingly, it is possible to know the residual receptible time by the detected voltage from the battery voltage detecting section 109. Alternatively, the relation between the output voltage of the battery 108 and the residual receptible time is enciphered, and the relationship is stored in the EEPROM 110, and the residual receptible time may be determined from the voltage of the battery 108.

Next, facsimile data from the transmission side is received (S67). Here, the control section 119 of the facsimile unit 102 stores the facsimile data from the transmission side in the memory 121 and decodes the data using the coding/decoding processing section 123 into image data, the image data being printed by the recording section 117. Or, if the memory intercepting is enabled, the received data from the transmission side is stored in the memory 121. The received data stored in the memory 121 by the memory intercepting as described above is immediately printed, if the recording section 117 is ready for printing.

When the printing or the memory intercepting is terminated, the control section 119 of the facsimile unit 102 requests the control section 105 of the portable wireless telephone unit 101 to disconnect the line. Thereby, the control section 105 of the portable wireless telephone unit 101 instructs the wireless circuit 103 to disconnect the line (S68), then terminating the process.

In step S65, if the reception is not enabled (S65: NO), the procedure proceeds to step S68, in which the line is disconnected and after this the procedure shifts to another processing.

In step S63, if the communication is not the facsimile communication (S63: NO), the control section 105 of the portable wireless telephone unit 101 performs the speech processing (S69). When the speech is completed, the procedure proceeds to step S68, in which the line is disconnected.

Further, in step S61, if a call from the transmission side is not present (S61: NO), the procedure returns to step S61. That is, standby till a call comes from the transmission side.

The operation of the portable communication apparatus on the transmission side will be described with reference to FIG. 12.

In the portable communication apparatus on the transmission side, first, the user operates the operating section 118 of the facsimile unit 102 to input the facsimile number on the receiving side. Then, the control section 119 of the facsimile unit 102 causes the control section 105 of the portable wireless telephone unit 101 to deliver a signal corresponding to the facsimile number input from the antenna 111 through the wireless circuit 103 (S71). Next, the control section 119 of the facsimile unit 102 judges whether or not the signal is arrived at the receiving side (S72). After confirmation of the reception (S72: YES), information from the receiving side is received to determined the transmission rate of the transmission data (S73). Next, the control section 119 of the facsimile unit 102 judges whether or not information relating to the residual receptible time issued in step S66 shown in FIG. 11 is received from the receiving side (S74). If received (S74: YES), the number of receptible document sheets on the receiving side is operated on the basis of the residual receptible time (S75). That is, the amount of data receivable till the receiving side reception is disabled due to the run-out of power in the battery can be determined from the receptible time received from the receiving side and the transmission rate of the transmission data.

Since coded data are transmitted from the transmission side, the amount of data after being coded differs with an image formed on a document page. Accordingly, since the number of receptible document sheets cannot be determined, a standard document for one page is first read to obtain first the amount of data for one page whereby the number of receptible document sheets can be determined roughly.

Next, the control section 119 of the facsimile unit 102 displays the number of receptible document sheets on the receiving side on a display section (not shown) of the facsimile unit 102 (S76). In the case where the number of receptible document sheets on the receiving side is too small as compared with the number of transmission sheets as desired, the user can operate the operating section 118 to cancel the transmission.

In the case where the operation such as erasure of transmission is not made by the user, the control section 119 of the facsimile unit 102 sets the number of receptible document sheets on the receiving side to M (S77) to judge whether or not M is 1 or more (S78). If M is 1 or more (S78: YES), at least one page can be transmitted, and the control section 119 of the facsimile unit 102 causes the reading section 116 to read one document page and store the image data in the memory 121. Further, the coding/decoding processing section 123 is used to code the image data within the memory 121 to cause the control section 105 of the portable wireless telephone unit 101 to transmit it (S79). When transmission of one page is terminated, the number of receptible document sheets is naturally reduced by one page, and the control section 119 of the facsimile unit 102 reduces M by 1 (S80) to judge whether or not a transmission document page is yet present (S81). If any transmission document page is not present (S81: NO), the control section 105 of the portable wireless telephone unit 101 disconnects the line (S82) to terminal the processing.

In step S81, if a transmission document page is present (S81: YES), the procedure returns to S78. And if M is 1 or more, a document page for next one page is transmitted (S79).

In step S78, if M is below 1 (S78: NO), the document pages for the number of receptible document sheets on the receiving side have been already transmitted. Therefore, if document page for next page is transmitted, the transmission possibly stops in the midst of the page due to the run-out of power in the battery 108 of the portable wireless telephone unit 101 on the receiving side. Therefore, in the case where M is below 1 (S78: NO) despite the presence of a document page to be transmitted, the procedure proceeds to step S82 to disconnect the line in order to avoid the state of the transmission stop.

In step S74, if information relating to the residual receptible time is not received from the receiving side (S74: NO), the procedure returns to step S74 to wait for the reception of the information relating to the residual receptible time from the receiving side. In step S72, if the transmission side cannot confirm the reception of a call by the receiving side (S72: NO), the procedure returns to step S71 to continue calling to wait for the reception. If the reception is not obtained after passage of a fixed time, calling is made to stop, and dialing can be made again as necessary.

As described above, in the portable communication apparatus according to the fourth embodiment, the voltage of the battery 108 is detected by the battery voltage detecting section 109 at reception, and the EEPROM 110 is retrieved on the basis of the detected voltage to thereby determine the residual receptible time to transmit it to the transmission side (S65). Accordingly, it is possible to stop the transmission on the basis of the operation of the user on the transmission side, and it is further possible to apply an adequate process for preventing the stoppage of the transmission in the midst of a page by transmitting originals for the number of sheets by which the transmission is not stopped in the midst of the page.

Further, the relation between the output voltage of the battery 108 and the residual receptible time is stored in advance in the EEPROM 110, the output voltage of the battery 108 is detected by the battery voltage detecting section 109 at reception, and the residual receptible time is judged from the detected voltage and the stored content of the EEPROM 110. Thus, the operational processing of the residual receptible time is not necessary, and the load of the control section 105 can be reduced, and the receptible time can be accurately obtained. Moreover, since the EEPROM 110 is a nonvolatile memory as is known, the stored content is not lost even if power in the battery 108 runs out.

Further, at the time of transmission, the number of receptible document sheets on the receiving side is determined (S75) on the basis of the residual receptible time sent from the receiving side and the data transmission rate when data is transmitted to and from the receiving side, so that document pages in excess of the number of receptible document sheets are not transmitted (S78 to S82). Therefore, no state occurs where power in the battery 108 of the portable wireless telephone unit 101 on the receiving side runs out in the midst of a page to stop the reception. Accordingly, it is not necessary to transmit again the whole of the page, for which reception is stopped part way through on the receiving side, on the transmission side, thus eliminating wasteful time and charges imposed.

Further, since the number of receptible document sheets on the receiving side is displayed on the display section on the transmission side (S76), the user can judge whether or not transmission is to be made. Thereby, in the case where the number of receptible document sheets on the receiving side is too small as compared with the number of transmission sheets as desired, it is possible to operate the operating section 118 to cancel the transmission.

While in the fourth embodiment, a description has been made of the portable communication apparatus in which the portable wireless telephone unit 101 is connected to the facsimile unit 102, it is to be noted that the present invention can be also applied to a portable communication apparatus comprised of a portable facsimile unit.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A communication apparatus, comprising:

a battery;

a detection device that detects a residual amount of power in said battery;

a communication device that communicates with other communication devices;

a control device that controls said communication device to communicate only when an operable transmission time, determined based on the residual amount of power in said battery detected by said detection device, exceeds a required transmission time determined based on an amount of data to be communicated;

an image memory for storing image data to be transmitted; and a transmission enabling device that enables a transmission of the image data stored in the image memory to a mating apparatus based on the determined amount of power and the residual amount of power in the battery detected by said detection device, the determined amount of power being a power that is required to transmit the amount of data corresponding to the image data stored in said image memory, wherein said control device controlling said communication device to transmit the image data stored in the image memory only when said transmission enabling device enables the transmission.

2. A communication apparatus according to claim 1, wherein said detection device detects an output voltage of the battery.

3. The communication apparatus according to claim 1, wherein said transmission enabling device determines that a transmission time required to transmit the image data stored in said image memory is less than an operable time that said communication apparatus can be operated by said residual amount of power in the battery detected by said detection device.

4. The communication apparatus according to claim 1, wherein said image memory comprises a nonvolatile memory, if the data stored in the nonvolatile memory has not been transmitted, said control device automatically transmitting the image data stored in said nonvolatile memory when the transmission enabling device enables the transmission.

5. A communication apparatus, comprising:

a battery;

a detection device that detects a residual amount of power in said battery;

a communication device that communicates with other communication devices;

a conversion device that converts the residual amount of power in said battery detected by said detection device into information relating to said residual amount of power in said battery;

a display device that displays the information; and a memory for storing data of document page, wherein said conversion device converts the residual amount of power in said battery detected by said detection device into an operable time that said communication device can be operated by said residual amount of power in said battery, wherein said conversion device converts the residual amount of power in said battery detected by said detection device into a number of sheets of document pages that can be transmitted by the communication apparatus having the residual amount of power in said battery, and wherein said conversion device determines the number of sheets of document pages that can be transmitted based on the residual amount of power in said battery and a transmission rate of said communication device.

6. A communication apparatus according to claim 5, wherein said conversion device has a nonvolatile memory that stores a relationship between the residual amount of power in said battery and said operable time.

7. The communication apparatus according to claim 5, wherein said conversion device has a nonvolatile memory that stores the relationship between the transmission rate of said communication device and a dial number of one of the other communication device.

8. A communication apparatus, comprising:

a battery;

a detection device that detects a residual amount of power in said battery;

a communication device that communicates with other communication devices; and a response device that informs a remotely located mating communication apparatus of the residual amount of power in said battery detected by said detection device when receiving a call from the remotely located mating communication apparatus.

9. A communication apparatus according to claim 8, wherein said detection device detects an output voltage of the battery.

10. A communication apparatus according to claim 8, wherein said response device converts the residual amount of power in the battery detected by said detection device into a number of receivable sheets and informs the remotely located mating communication apparatus of said number of receivable sheets, and said communication device receives image data transmitted from said remotely located mating communication apparatus.

11. A communication apparatus according to claim 10, wherein said conversion device has a nonvolatile memory that stores a relationship between the residual amount of power in said battery and an operable time.

12. A communication apparatus according to claim 10, further comprising:

a display device that displays the number of said receivable sheets.

13. A communication system that provides communication between a communication apparatus that includes a battery and a separate communication apparatus, said communication apparatus comprising:

a detection device that detects a residual amount of power in said battery;

a communication device that communicates with said separate communication apparatus; and a response device that converts the residual amount of power in said battery detected by said detection device into a number of receivable sheets when receiving a call from said separate communication apparatus, and for informing said separate apparatus of said number of receivable sheets, wherein said separate communication apparatus comprises a control device that controls said separate communication apparatus to transmit images requiring a number of sheets less than or equal to said number of receivable sheets received from said communication apparatus.

14. A communication system according to claim 13, wherein said separate communication apparatus further comprises:

a display device that displays said number of receivable sheets received from said communication apparatus.

15. A communication system according to claim 13, wherein said detection device detects an output voltage of said battery.

* * * * *